(12) United States Patent
Lee et al.

(10) Patent No.: US 8,121,627 B2
(45) Date of Patent: Feb. 21, 2012

(54) METHOD AND MOBILE TERMINAL FOR OUTPUTTING AUTOMATIC RESPONSE MESSAGE WITH IMPLEMENTATION OF SCHEDULE MANAGEMENT FUNCTION

(75) Inventors: Ho-Jun Lee, Hwaseong-si (KR); Chul-Yong Jeon, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1038 days.

(21) Appl. No.: 11/835,205

(22) Filed: Aug. 7, 2007

(65) Prior Publication Data

US 2008/0032675 A1    Feb. 7, 2008

(30) Foreign Application Priority Data

Aug. 7, 2006  (KR) .................. 10-2006-0074194

(51) Int. Cl.
*H04W 4/00* (2009.01)
*H04M 1/00* (2006.01)

(52) U.S. Cl. .................. 455/466; 455/550.1; 455/414.1; 455/566

(58) Field of Classification Search .................. 455/557, 455/412, 567, 414.1, 550.1, 413, 412.1, 456.3, 455/556.1, 466, 566, 456.1; 379/88.23
See application file for complete search history.

(56) References Cited

U.S. PATENT DOCUMENTS

| | | | |
|---|---|---|---|
| 6,317,593 B1 * | 11/2001 | Vossler | 455/414.1 |
| 2002/0142756 A1 * | 10/2002 | Rutledge et al. | 455/412 |
| 2003/0210771 A1 * | 11/2003 | Broussard et al. | 379/88.23 |
| 2004/0198461 A1 * | 10/2004 | Coombes | 455/567 |
| 2005/0136976 A1 * | 6/2005 | Shoemake | 455/557 |
| 2005/0153729 A1 * | 7/2005 | Logan et al. | 455/550.1 |

FOREIGN PATENT DOCUMENTS

| | | |
|---|---|---|
| JP | 2002-111569 | 4/2002 |
| KR | 10-1998-0086259 | 12/1998 |
| KR | 102001009004 | 10/2001 |
| KR | 102002008758 | 11/2002 |
| KR | 1020060033227 | 4/2006 |

* cited by examiner

Primary Examiner — Kiet Doan
(74) Attorney, Agent, or Firm — The Farrell Law Firm, P.C.

(57) ABSTRACT

Disclosed are a method and a mobile terminal for outputting an automatic response message informing a caller of a user's (i.e. recipient's) current schedule when the user is unable to answer an incoming call. The method includes receiving an incoming call, determining whether an automatic response key is pressed to output an automatic response message with implementation of the schedule management function, detecting any schedule information corresponding to the current time by reference to a schedule management table when the automatic response key is pressed, and sending a schedule informing message including the detected schedule information to a caller's terminal.

24 Claims, 4 Drawing Sheets

| | DATE OF SCHEDULE | TIME OF SCHEDULE | DESCRIPTION OF SCHEDULE |
|---|---|---|---|
| 1 | DATE 1 | 10:00 ~ 12:00 | WEEKLY MEETING |
| 2 | DATE 1 | 19:00 ~ 21:00 | OUTSIDE LECTURE |
| 3 | DATE 1 | 21:00 ~ 22:00 | APPOINTMENT TO MEET FRIENDS |
| 4 | DATE 2 | 9:00 ~ 11:00 | OUTSIDE MEETING |
| ⋮ | ⋮ | ⋮ | ⋮ |

| | DATE OF SCHEDULE | TIME OF SCHEDULE | DESCRIPTION OF SCHEDULE |
|---|---|---|---|
| 1 | DATE 1 | 10:00 ~ 12:00 | WEEKLY MEETING |
| 2 | DATE 1 | 19:00 ~ 21:00 | OUTSIDE LECTURE |
| 3 | DATE 1 | 21:00 ~ 22:00 | APPOINTMENT TO MEET FRIENDS |
| 4 | DATE 2 | 9:00 ~ 11:00 | OUTSIDE MEETING |
| ⋮ | ⋮ | ⋮ | ⋮ |

METHOD AND MOBILE TERMINAL FOR OUTPUTTING AUTOMATIC RESPONSE MESSAGE WITH IMPLEMENTATION OF SCHEDULE MANAGEMENT FUNCTION

PRIORITY

This application claims priority to an application entitled "Method and Mobile Terminal for Outputting Automatic Response Message with Implementation of Schedule Management Function" filed with the Korean Intellectual Property Office on Aug. 7, 2006 and assigned Serial No. 2006-74194, the contents of which are incorporated herein by reference.

BACKGROUND OF THE INVENTION

1. Field of the Invention

The present invention relates generally to a method and a mobile terminal for sending an automatic response message to a caller's terminal, and more particularly to a method and a mobile terminal for outputting an automatic response message with implementation of a schedule management function.

2. Description of the Related Art

With the rapid development of mobile communication technologies and the exponential increase in the number of mobile subscribers, mobile terminals have also evolved to offer various additional services to meet subscriber demands. One such additional service is a voicemail service. When a mobile phone is turned off or when a user is unable to answer or is handling another call, voicemail answers incoming calls with a greeting message and then asks callers to leave messages. The user can listen to the voicemail messages at any time thereafter on the mobile phone. When a caller leaves a voicemail message, the mobile phone displays a text notification of the new voicemail message. If the caller leaves a telephone number with the voicemail message, the mobile phone will also display the caller's telephone number on a display screen.

Also, the mobile phone may output a previously stored voice message informing the callers that the user is unable to answer calls.

As explained above, when the user is handling another call or unable to answer, all incoming calls can be diverted automatically to the voicemail box. Alternatively, a previously stored voice message can be outputted from the mobile phone.

When hearing a voicemail greeting, callers typically leave their messages in the recipient's voicemail box. They will wait for a response call, or repeatedly dial and leave messages until they receive a response call from the recipient. It can be frustrating for a caller to continuously try to call the recipient while not knowing why the recipient will not answer. The repeated dialing and access to the recipient's voicemail also increases phone call charges.

Moreover, a voice message previously stored and outputted for any incoming call is a standard uniform message which does not specifically inform the callers why the recipient is unable to answer their calls.

SUMMARY OF THE INVENTION

Accordingly, the present invention has been made to solve the above-mentioned problems occurring in the prior art, and an object of the present invention is to provide a method and a mobile terminal for outputting an automatic response message informing a caller of a user's (i.e. recipient's) current schedule when the user is unable to answer an incoming call.

Another object of the present invention is to provide a method and a mobile terminal for outputting an automatic response message informing a caller of a user's current schedule and a possible contact time when the user is unable to answer an incoming call.

In accordance with a first aspect of the present invention for accomplishing the above objects, there is provided a mobile terminal having a schedule management function, which comprises: a key input unit for outputting a signal corresponding to a key pressed by a user and including an automatic response key for outputting an automatic response message with implementation of the schedule management function; a memory for storing a schedule management table including at least one schedule information, and standard voice message informing the callers that the user is unable to answer calls; and a control unit for determining whether the automatic response key is pressed when an incoming call is received, detecting any schedule information corresponding to the current time by reference to the schedule management table when the automatic response key is pressed, and sending a schedule informing message including the detected schedule information to a caller's terminal.

In accordance with a second aspect of the present invention, there is provided a mobile terminal having a schedule management function, which includes a key input unit for outputting a signal corresponding to a key pressed by a user, a memory for storing a schedule management table including at least one piece of schedule information, and a control unit for determining whether an automatic response mode is set to be implemented with the schedule management function when an incoming call is received, detecting any schedule information corresponding to the current time by reference to the schedule management table when the automatic response mode is set, and sending a schedule informing message including the detected schedule information to a caller's terminal.

In accordance with a third aspect of the present invention, there is provided a method for outputting an automatic response message in a mobile terminal having a schedule management function, which method includes receiving an incoming call, determining whether an automatic response key is pressed to output an automatic response message with implementation of the schedule management function, detecting any schedule information corresponding to the current time by reference to a schedule management table when the automatic response key is pressed, and sending a schedule informing message including the detected schedule information to a caller's terminal.

In accordance with a fourth aspect of the present invention, there is provided a method for outputting an automatic response message in a mobile terminal having a schedule management function, which method includes receiving an incoming call, determining whether an automatic response mode is set to be implemented with the schedule management function, detecting any schedule information corresponding to the current time by reference to a schedule management table when the automatic response mode is set, and sending a schedule informing message including the detected schedule information to a caller's terminal.

BRIEF DESCRIPTION OF THE DRAWINGS

The above and other objects, features and advantages of the present invention will be more apparent from the following detailed description taken in conjunction with the accompanying drawings, in which:

FIG. 4 illustrates a schedule management table for storing schedules according to the present invention.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted for the sake of clarity and conciseness.

The present invention provides a method and a mobile terminal for detecting any schedule information corresponding to the time of an incoming call if a user is unable to answer the call, and automatically sending the detected schedule information in the form of a voice message to a caller. The mobile terminal also checks a possible contact time and sends the possible contact time information together with the schedule information in the form of a voice message.

Figure 1:
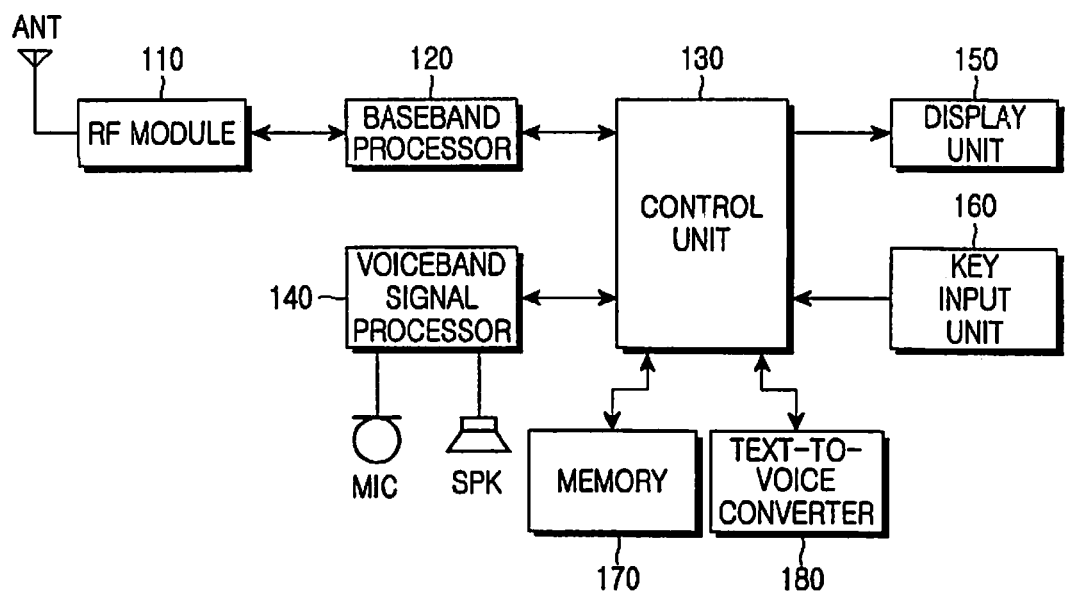
FIG. 1 illustrates a mobile terminal capable of outputting an automatic response message with implementation of a schedule management function according to the present invention.

FIG. 1 illustrates a mobile terminal capable of outputting an automatic response message with implementation of a schedule management function according to the present invention.

Referring to FIG. 1, the mobile terminal includes an RF (Radio Frequency) module 110, a baseband processor 120, a control unit 130, a voiceband signal processor 140, a display unit 150, a key input unit 160, a memory 170 and a text-to-voice converter 180.

The control unit 130 controls overall operations of the mobile terminal, including voice communication and data transmission. When an incoming call is received, the control unit 130 detects whether an automatic response key is pressed. Upon detecting the input of the automatic response key, the control unit 130 searches for any schedule information corresponding to the current time (i.e., the instant time) by reference to a schedule management table. When the corresponding schedule information is detected, the control unit 130 sends a schedule informing message including the detected schedule information to a caller's terminal. This controlling process for sending a schedule informing message will be explained in further detail with reference to FIGS. 2 and 3.

The display unit 150 displays various messages or information under the control of the control unit 130. The display unit 150 may include an LCD (Liquid Crystal Display), a TFT (Thin Film Transistor) or an organic EL (ELectroluminescence).

The key input unit 160 includes a plurality of alphanumeric keys and function keys and outputs input data corresponding to a key pressed by a user. According to the present invention, the key input unit 160 may additionally include an automatic response key. Alternatively, one of the alphanumeric keys or function keys may be provided with a function for outputting an automatic response message.

The memory 170 connected to the control unit 130 includes a ROM (Read Only Memory) and a RAM (Random Access Memory) for storing a plurality of programs and data necessary to control the operations of the mobile terminal. Particularly, the memory 170 stores programs for implementing the operation for outputting an automatic response message according to the present invention. It also stores a schedule management table including dates, times and descriptions of schedules as illustrated in FIG. 4. In FIG. 4, each piece of schedule information is stored with these three items recorded.

Referring to FIGS. 1 and 4, the memory 170 previously stores a standard voice message and a voice message which can be sent with schedule information. If the user sets an automatic response mode for an incoming call and there is no registered schedule corresponding to the current time, the standard voice message will be outputted to simply inform the caller that the user is unable to answer the call. Typically, the standard voice message is "I am unable to answer your call at the present time." Also, the voice message including schedule information can be "I am unable to answer your call at this time because of A (schedule). You can contact me after B (time)." The latter voice message is used to generate a schedule informing message which informs the caller of the reason why the user does not answer the call by including the user's schedule in A and possible contact time in B. The voice message including schedule information may or may not be separately stored in the memory 170. If this voice message is not stored, the control unit 130 can convert the schedule information corresponding to the current time into voice and output the voice information.

Referring to FIG. 1, the RF module 110 sends and receives RF signals to and from a base station through an antenna to perform wireless communication with the base station. The RF module 110 converts a received RF signal into an IF (Intermediate Frequency) signal and outputs the IF signal to the baseband processor 120. Also, the RF module 110 converts an IF signal inputted from the baseband processor 120 into an RF signal and sends the RF signal.

As a BAA (Baseband Analog ASIC (Application-Specific Integrated Circuit)) that provides an interface between the control unit 130 and the RF module 110, the baseband processor 120 converts a baseband digital signal applied from the control unit 130 into an analog IF signal and applies the analog IF signal to the RF module 110. The baseband processor 120 converts an analog IF signal applied from the RF module 110 into a baseband digital signal and applies the digital signal to the control unit 130. A voiceband signal processor 140 connected to the control unit 130 is also connected to a MIC (MICrophone) and an SPK (SpeaKer). The voiceband signal processor 140 converts a voice signal received from the microphone into data and outputs the data to the control unit 130. It also converts voice data inputted from the control unit 130 into audible sound and outputs the sound to the speaker.

The text-to-voice converter 170 converts schedule information stored in text into voice under the control of the control unit 130.

Figure 2:
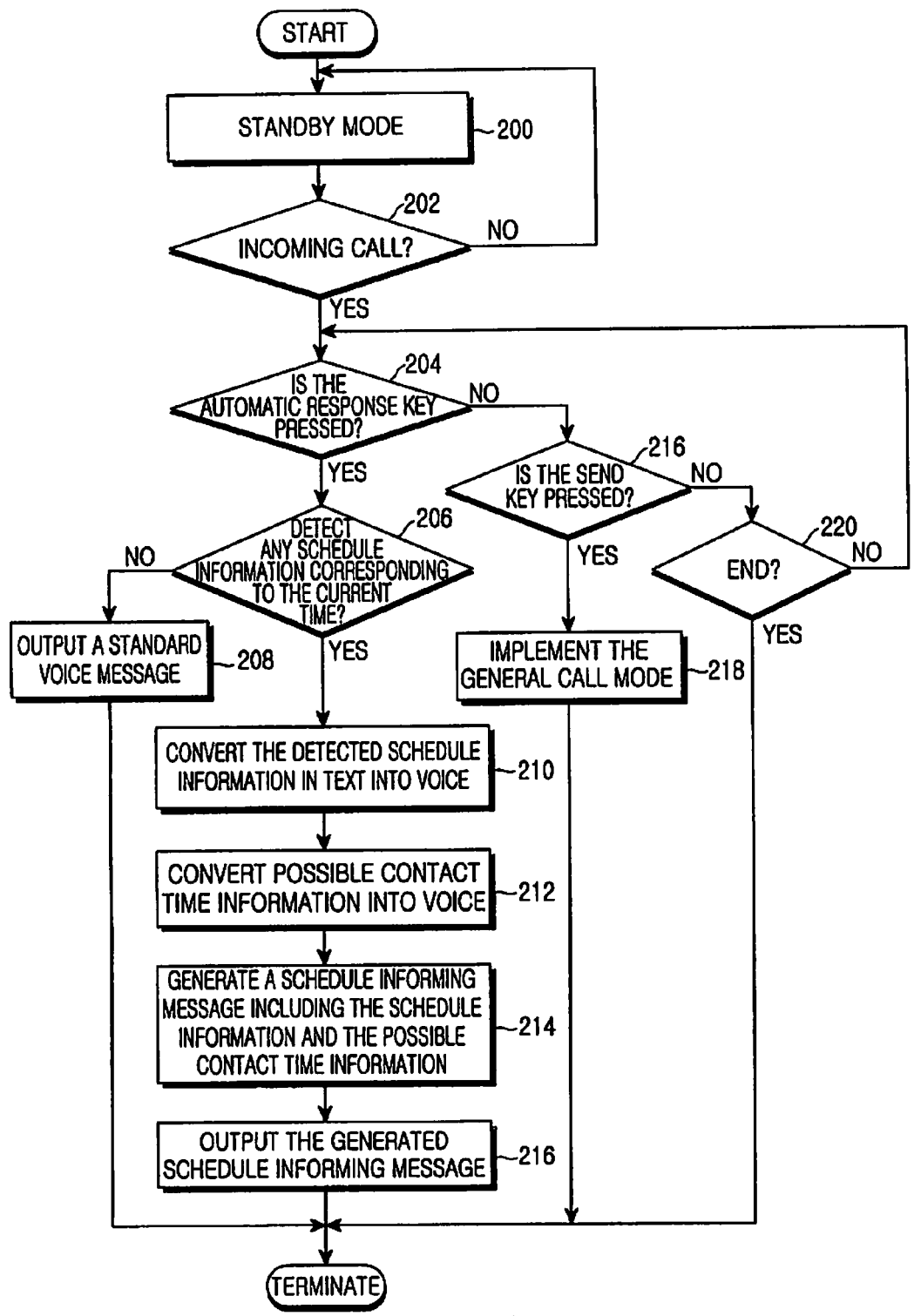
FIG. 2 illustrates a process of outputting an automatic response message with implementation of a schedule management function according to a first embodiment of the present invention.

FIG. 2 illustrates a process of outputting an automatic response message with implementation of a schedule management function according to a first embodiment of the present invention.

Referring to FIGS. 1 and 2, while the mobile terminal is in a standby mode in step 200, the control unit 130 checks whether an incoming call is received in step 202. When there is an incoming call, the control unit 130 proceeds to step 204.

Otherwise, the control unit 130 returns to step 200 to maintain the mobile terminal in the standby mode.

In step 204, the control unit 130 determines whether an automatic response key is pressed. If the automatic response key is pressed, the control unit 130 will proceed to step 206. Otherwise, the control unit 130 will proceed to step 216. The automatic response key is not for outputting a typical voice message informing a caller that the user is unable to answer a call at the present time, but instead is for outputting a schedule informing message which informs a caller of the user's schedule at the present time. If the automatic response key is pressed in step 204, the control unit 130 will proceed to step 206 in order to detect any schedule information corresponding to the current time, i.e. the incoming call receiving time. More specifically, the control unit 130 checks schedule date/time information included in the schedule management table in order to detect any task or appointment schedule falling on the current date and time (i.e., the instant date and time). For example, if an incoming call is received at 11:00 a.m. of a particular date called "Date 1", the control unit 130 will check the schedule dates and times included in the schedule management table as illustrated in FIG. 4, and will detect that the schedule in field 1 of the schedule management table corresponds to the current date and time (Date 1, 11:00 a.m.).

If a schedule falling on the current date and time is detected in step 206, the control unit 130 will proceed to step 210. Otherwise, the control unit 130 will recognize that there is no schedule falling on the current date and time, and will output a standard voice message which simply informs the caller that the user is unable to answer the call at this time.

In step 210, the control unit 130 controls the text-to-voice converter 180 to convert into voice the detected schedule information corresponding to the current time, which is stored in text. For example, if the schedule "weekly meeting" in field 1 of the schedule management table corresponds to the current date and time, the control unit 130 will convert the text schedule "weekly meeting" into voice and will then proceed to step 212.

In step 212, the control unit 130 checks a possible contact time by reference to the schedule management table and converts the possible contact time information into voice. The possible contact time refers to a time after the detected schedule, and more particularly to a time period during which the user is available with no registered schedule entry after the detected schedule. Referring to FIG. 4, if the task "weekly meeting" in field 1 of the schedule management table is scheduled to end at noon, the possible contact time will be after noon. More particularly, the possible contact time will be after noon and before 19:00 (i.e., 7:00 p.m.) because the next task in field 2 is scheduled to begin at 19:00. Since the schedule management table shows that no schedule is registered between noon and 19:00 and between 22:00 (i.e., 10:00 p.m.) and 24:00 (i.e., midnight) on Date 1, possible contact times can be between noon and 19:00 and between 22:00 and 24:00. It is possible to set whether to inform the time after the detected schedule (for example, after noon) or every possible contact time of the date (for example, between noon and 19:00 and between 22:00 and 24:00).

The control unit 130 generates a schedule informing message which includes the schedule information converted into voice in step 210 and the possible contact time information converted into voice in step 212. Then, the control unit 130 sends the generated schedule informing message to the caller's terminal through the RF module 110. Assuming that the mobile terminal is set to generate a schedule informing message stating "I am unable to answer your call at this time because of A. You can contact me after B." with the user's current schedule stated in A and a possible contact time stated in B, the generated schedule informing message will be "I am unable to answer your call at this time because of a weekly meeting. You can contact me after noon."

According to the first embodiment of the present invention as explained with reference to FIG. 2, a schedule informing message including the schedule information converted into voice in step 210 and the possible contact time information converted into voice in step 212 is sent to the caller's terminal. The mobile terminal can be set to generate and send a schedule informing message including only the schedule information, skipping step 212. Also, a schedule informing message format may or may not be separately stored in the memory 170. If the message format is not stored, the control unit 130 can convert the schedule information corresponding to the current time into voice and output the voice information.

If the automatic response key is not pressed in step 204, the control unit 130 will determine whether a send key is pressed in step 216. If the send key is pressed, the control unit 130 will implement a general call mode in step 218. Otherwise, the control unit 130 will determine whether an end key is pressed in step 220. If the end key is pressed, the control unit 130 will end the current incoming call. Otherwise, the control unit 130 will repeat step 204.

According to the first embodiment of the present invention as explained with reference to FIG. 2, the mobile terminal sends a schedule informing message including at least one of the current schedule information and the possible contact time information to the caller's terminal only upon the user's input of the automatic response key.

Figure 3:
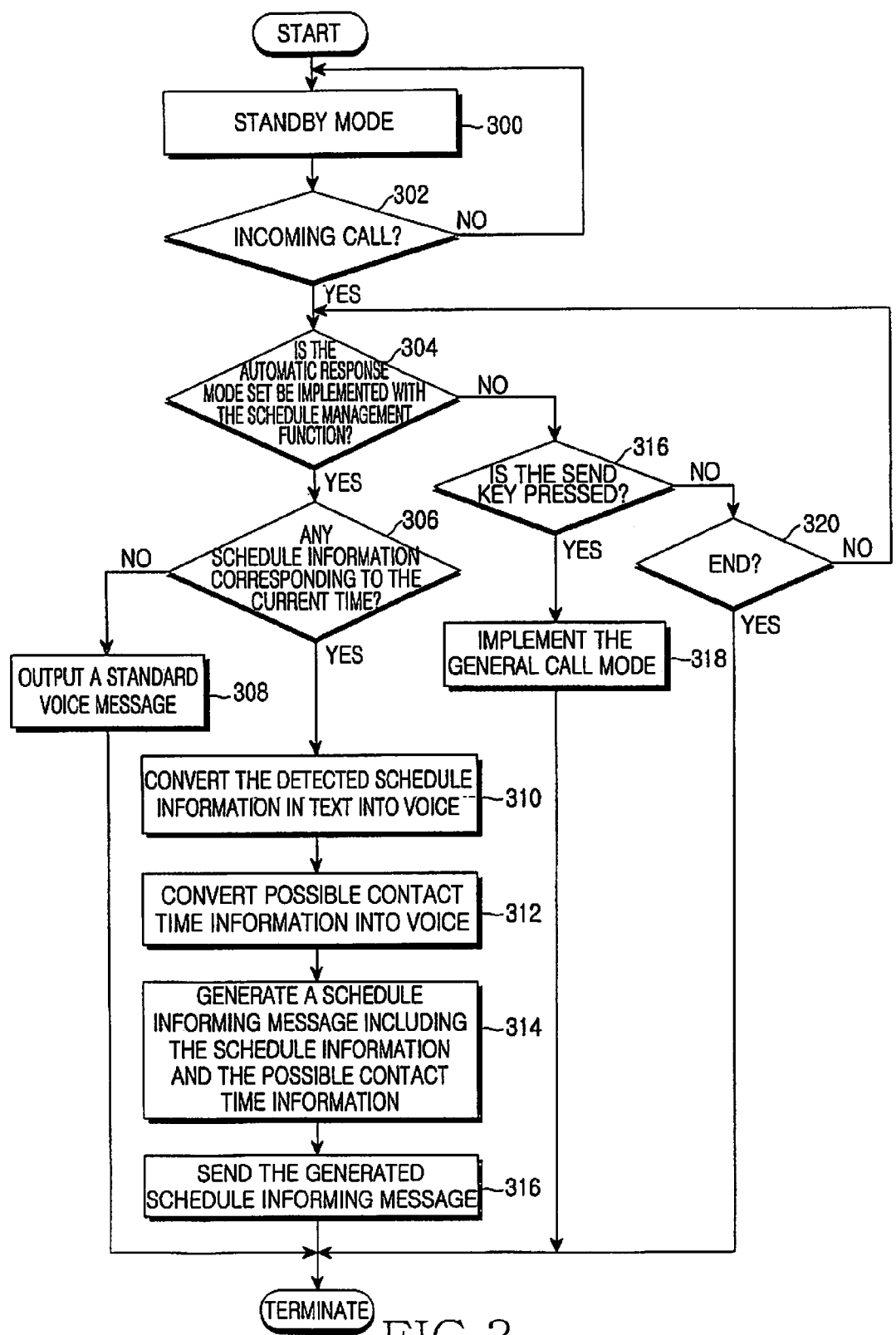
FIG. 3 illustrates a process of outputting an automatic response message with implementation of a schedule management function according to a second embodiment of the present invention.

FIG. 3 illustrates the automatic generation and output of a schedule informing message according to a second embodiment of the present invention.

While the mobile terminal is in the standby mode in step 300, the control unit 130 checks whether an incoming call is received in step 302. When there is an incoming call, the control unit 130 proceeds to step 304 in order to confirm whether the automatic response mode is set to be implemented with the schedule management function. If the automatic response mode is set, the control unit 130 will proceed to step 306. Otherwise, the control unit 130 will proceed to step 316.

Subsequent steps 306, 308, 310, 312, 314 and 316 are identical to steps 206, 208, 210, 212, 214 and 216, respectively, in FIG. 2. In these steps, the control unit 130 detects any schedule corresponding to the current date and time (i.e. the incoming call receiving time) by reference to the schedule management table, generates a schedule informing message including the detected schedule information, and sends the schedule informing message to the caller's terminal. In steps 316, 318 and 320 which are identical to step 216, 218 and 220, respectively, in FIG. 2, the control unit 130 implements a general call mode.

Although a schedule informing message including the schedule information converted into voice in step 310 and the possible contact time information converted into voice in step 312 is sent to the caller's terminal according to the second embodiment of the present invention as explained with reference to FIG. 3, the mobile terminal can be set to generate and send a schedule informing message including only the schedule information, skipping step 312. Also, a schedule informing message format may or may not be separately stored in the memory 170. If the message format is not stored, the control unit 130 can convert the schedule information corresponding to the current time into voice and output the voice information.

When an incoming call is received, the mobile terminal may determine whether the silent or vibration mode is currently set according to another embodiment of the present invention, instead of determining whether the automatic response mode is set to be implemented with the schedule management function. Subsequently, the mobile terminal may perform the same operations as steps 306 through 316 in FIG. 3 to inform the caller of the user's current schedule.

As explained above, when the user is unable to answer an incoming call, the mobile terminal according to the present invention generates an automatic response message including the user's current schedule and a possible contract time, and sends the generated message to a caller's terminal, thereby informing the caller of the reason why the user is unable to answer the call.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A mobile terminal having a schedule management function, said mobile terminal comprising:
   a key input unit for outputting a signal corresponding to a key pressed and including an automatic response key for sending an automatic response message with implementation of the schedule management function;
   a memory for storing a schedule management table including at least one piece of schedule information, and a standard voice message informing the callers that the user is unable to answer calls, wherein the schedule management table describes appointments of the user; and
   a control unit for determining whether the automatic response key is pressed in order to send schedule information corresponding to a current time when an incoming call is received, detecting any schedule information corresponding to the current time from the schedule management table when the automatic response key is pressed, sending a schedule informing message including the detected schedule information to a caller's terminal when the schedule information corresponding to the current time is detected, and the standard voice message to a caller's terminal when the schedule information corresponding to the current time is not detected;
   wherein the schedule information comprises at least a description of an appointment of the user for the current time, and the description is stored in the memory as text data or sound data.

2. The mobile terminal according to claim 1, wherein said schedule management table has at least one schedule field including at least one of a schedule date item, a schedule time item and a user appointment description item.

3. The mobile terminal according to claim 2, wherein said control unit detects any schedule information corresponding to the current time by detecting one or more schedule fields including an identical date as a current date in the schedule management table and detecting a schedule field including the current time among the detected schedule fields.

4. The mobile terminal according to claim 1, wherein said control unit converts the detected schedule information into voice, generates a schedule informing message by including the schedule information converted into voice in a previously stored voice message, and sends the generated schedule informing message to the caller's terminal.

5. The mobile terminal according to claim 1, wherein the schedule informing message further includes a possible contact time during which the user can be reached that is derived from the schedule management table.

6. The mobile terminal according to claim 5, wherein said possible contact time is a time period during which the user is available and has no registered schedule entry after the detected schedule.

7. A mobile terminal having a schedule management function, said mobile terminal comprising:
   a key input unit for outputting a signal corresponding to a key pressed;
   a memory for storing a schedule management table including at least one piece of schedule information, and a standard voice message informing the callers that the user is unable to answer calls, wherein the schedule management table describes appointments of the user; and
   a control unit for determining whether an automatic response mode is set to be implemented with the schedule management function when an incoming call is received, detecting any schedule information corresponding to a current time from the schedule management table when the automatic response mode is set, and sending a schedule informing message including detected schedule information to a caller's terminal when the schedule information corresponding to the current time is detected, and the standard voice message to a caller's terminal when the schedule information corresponding to the current time is not detected;
   wherein the schedule information comprises at least a description of an appointment of the user for the current time, and the description is stored in the memory as text data or sound data.

8. The mobile terminal according to claim 7, wherein said schedule management table has at least one schedule field including at least one of a schedule date item, a schedule time item and a user appointment description item.

9. The mobile terminal according to claim 8, wherein said control unit detects any schedule information corresponding to the current time by detecting one or more schedule fields including an identical date as a current date in the schedule management table and detecting a schedule field including the current time among the detected schedule fields.

10. The mobile terminal according to claim 7, wherein said control unit converts the detected schedule information into voice, generates a schedule informing message by including the schedule information converted into voice in a previously stored voice message, and sends the generated schedule informing message to the caller's terminal.

11. The mobile terminal according to claim 7, wherein the schedule informing message further includes a possible contact time during which the user can be reached that is derived from the schedule management table.

12. The mobile terminal according to claim 11, wherein said possible contact time is a time period during which the user is available and has no registered schedule entry after the detected schedule.

13. A method for outputting an automatic response message in a mobile terminal having a schedule management function, said method comprising the steps of:
   determining, when an incoming call is received, whether an automatic response key is pressed to sending an automatic response message with implementation of the schedule management function;
   detecting, when the automatic response key is pressed, any schedule information corresponding to a current time from a schedule management table, wherein the schedule management table describes appointments of the user; and sending a schedule informing message including the detected schedule information to a caller's terminal when the schedule information corresponding to the current time is detected, and a standard voice message to a caller's terminal when the schedule information corresponding to the current time is not detected;

wherein the schedule information comprises at least a description of an appointment of the user for the current time, and the description is stored in the memory as text data or sound data.

14. The method according to claim 13, wherein said schedule management table has at least one schedule field including at least one of a schedule date item, a schedule time item and a user appointment description item.

15. The method according to claim 14, wherein the detecting of any schedule information corresponding to the current time further includes detecting one or more schedule fields including an identical date as a current date in the schedule management table; and detecting a schedule field including the current time among the detected schedule fields.

16. The method according to claim 13, wherein the sending of the schedule informing message further includes converting the detected schedule information into voice, generating a schedule informing message by including the schedule information converted into voice in a previously stored voice message, and sending the generated schedule informing message to the caller's terminal.

17. The method according to claim 13, wherein the schedule informing message further includes a possible contact time during which the user can be reached that is derived from the schedule management table.

18. The method according to claim 17, wherein said possible contact time is a time period during which the user is available and has no registered schedule entry after the detected schedule.

19. A method for outputting an automatic response message in a mobile terminal having a schedule management function, said method comprising the steps of:

determining, when an incoming call is received, whether an automatic response mode is set to be implemented with the schedule management function;

detecting, when the automatic response mode is set, any schedule information corresponding to a current time from a schedule management table, wherein the schedule management table describes appointments of the user; and sending a schedule informing message including the detected schedule information to a caller's terminal when the schedule information corresponding to the current time is detected, and a standard voice message to a caller's terminal when the schedule information corresponding to the current time is not detected;

wherein the schedule information comprises at least a description of an appointment of the user for the current time, and the description is stored in the memory as text data or sound data.

20. The method according to claim 19, wherein said schedule management table has at least one schedule field including at least one of a schedule date item, a schedule time item and a user appointment description item.

21. The method according to claim 20, wherein the detecting of any schedule information corresponding to the current time further includes detecting one or more schedule fields including an identical date as a current date in the schedule management table, and detecting a schedule field including the current time among the detected schedule fields.

22. The method according to claim 19, wherein sending the schedule informing message further includes converting the detected schedule information into voice, generating a schedule informing message by including the schedule information converted into voice in a previously stored voice message, and sending the generated schedule informing message to the caller's terminal.

23. The method according to claim 19, wherein the schedule informing message further includes a possible contact time during which the user can be reached that is derived from the schedule management table.

24. The method according to claim 23, wherein said possible contact time is a time period during which the user is available and has no registered schedule entry after the detected schedule.

* * * * *